United States Patent [19]

Heller, Jr. et al.

[11] 3,941,641

[45] Mar. 2, 1976

[54] BONDING METHOD AND APPARATUS

[75] Inventors: William C. Heller, Jr., Milwaukee, Wis.; Alfred F. Leatherman, Columbus, Ohio

[73] Assignee: William C. Heller, Jr., Milwaukee, Wis.

[22] Filed: Feb. 26, 1974

[21] Appl. No.: 445,983

[52] U.S. Cl. .................. 156/272; 156/69; 156/306; 156/380; 219/10.55 M
[51] Int. Cl.² .......................................... B29C 27/04
[58] Field of Search ............ 156/272, 273, 380, 69, 156/306; 219/10.55

[56] References Cited
UNITED STATES PATENTS

| | | | |
|---|---|---|---|
| 3,026,233 | 3/1962 | Scholl et al. | 156/272 |
| 3,461,014 | 8/1969 | James | 156/272 |
| 3,730,804 | 5/1973 | Dickey | 156/272 |

Primary Examiner—Edward G. Whitby
Attorney, Agent, or Firm—Andrus, Sceales, Starke & Sawall

[57] ABSTRACT

An improved method and apparatus for bonding plastic materials includes placement of minute particles at the interface, either between the interface surfaces or within one or both of the interface materials. A particle-moving field, such as an alternating magnetic field where magnetic particles are employed, is created across the interface to directly and correspondingly impress the alternating magnetic field on the magnetic particles while the interface is in a generally movable or yielding state. The magnetic particles, either as a result of premagnetization or in response to the impressed magnetic field, form individual magnets which move to align themselves with the impressed field in accordance with the direction of the relative polarizations. The alternating magnetic field continuously moves the particles and by proper orientation causes them to oscillate, rotate or otherwise move within the fluid interface material to move and intermix the plastic material and thereby produce an improved interface bond between the materials. The agitation may also create a mechanical interlocking of the materials even though fusion may not be created. The magnetic particles may be selected to also respond to a radio-frequency magnetic field to rapidly generate heat and thus simultaneously create the fluid material at the interface with the material agitation. The magnetic particles may further include particles to reduce the reluctance of the flux path to increase the magnetic intensity.

19 Claims, 9 Drawing Figures

BONDING METHOD AND APPARATUS

BACKGROUND OF THE INVENTION

The present invention relates to an improved bonding method and apparatus and particularly to such a method and apparatus for fusing two adjoining plastic surfaces.

Plastic materials have found widely varying applications both as basic structural elements and as accessory elements such as coverings or enclosures of a rigid or a flexible plastic for packaging of other elements and the like. Thermoplastic materials of similar as well as many that have dissimilar characteristics can be permanently connected through the heating of the interface of a critical temperature and applying an appropriate pressure with the heat at the critical temperature. A particularly satisfactory method and system is shown in U.S. Pat. No. 3,574,031 to Heller et al. As more fully disclosed therein, discrete susceptor particles are introduced into the fusion area and subjected to a high-frequency magnetic induction field, generally in the radio-frequency range. The plastic material immediately adjacent to the particles is converted to a fluid state, either a liquid or at least a softened flowable state, as a result of the heat generated in the particles as such. By the proper control of various parameters, the flowing condition of the plastic is accurately controlled and produces a highly satisfactory fusion bond or weld at the interface of the surfaces. As further disclosed therein, the susceptor particles may be disposed directly upon the surfaces to be joined or supported within an intermediate bond agent or layer interposed between two opposed substrates. The particles may also be embedded directly within one or both of the surfaces to be joined. As particularly disclosed in the above patent and others held by present assignee, the use of the discrete particles does produce a highly satisfactory and novel method of heating and of sealing thermoplastic members. However, as also pointed out in such art, the creation of an effective and firm bond between plastic materials requires consideration of many parameters including control of the proper temperature, proper pressures and, in particular, control of the heat location. Further, the joining of certain different particular plastics is extremely difficult because of the different sealing characteristics—thus, a particular optimum heat, pressure and time for the plastic of the one element may not be the same for the plastic of the second element. Although an intermediate bonding agent may contribute to an improved bond because of characteristics more compatible with the two different plastics, the results have not been considered highly satisfactory in many cases.

SUMMARY OF THE PRESEENT INVENTION

The present invention is particularly directed to an improved method and apparatus for bonding plastic materials and the like generally by such fusion processes. Generally, in accordance with the present invention, the bonding surfaces are agitated or moved relative to each other to enhance the bonding action. In accordance with an important and unique concept and teaching of the present invention, the bonding interfaces are agitated by a forced movement of minute interface particles as a result of an impressed energy field with a corresponding movement of the plastic material to improve the interaction between the two surfaces while they are in the intermediate fluid or movable bonding condition. The agitation contributes to the intermixing at the interface with improved wetting characteristic and increases the strength of the bond between the joining surfaces. In a particularly novel feature and aspect of the present invention, at least one of the interfaces is formed with magnetic particles which are capable of forming magnets such for example as those disclosed in U.S. Pat. No. 3,665,856 which relates to an electric field printing method or U.S. Pat. No. 3,526,708 which relates to a magnetic printing method. In accordance with the teaching of the present invention, a magnetic field source means is applied to the interface surfaces to directly and correspondingly impress a magnetic field on the magnetic particles while the interface is in the fluid joining state. The magnetic field source means is in accordance with one aspect of this invention operated to shift the line of direction of the magnetic field polarization relative to the bonding surfaces. The magnetic particles, either as a result of premagnetization or in response to the impressed magnetic field, are individual magnets and will tend to align themselves in a given direction within the impressed field in accordance with the direction of polarization. Each time the field direction changes, the particles tend to rotate or reorient in the required direction in order to again align themselves in a corresponding relative direction in the impressed field. Alternatively, if the bonding material is an elastic nature, a pulsed magnetic field may periodically move the particles with a stressing of the material which acts to return the particles between pulses. The moving impressed magnetic field will thus continuously move the particles and by proper orientation cuase them to move back-and-forth within the fluid interface. The resulting particle agitation will move and intermix the plastic material to produce a desired increased interface bond strength. The agitation generating magnetic field is preferably a relatively low-frequency alternating field impressed directly across the interface.

The present invention may with particular advantage employ a complex magnetic field having the combination of an audio-or similar low-frequency agitation field component and a radio-or similar high-frequency heat-generating field component. Thus, with magnetic particles of the character disclosed in U.S. Pat. No. 3,574,031 and the like to form susceptor particles, the radio-frequency field component will interact thereon to rapidly generate heat and in a very controlled manner within the interface area. The audio-frequency magnetic field component will vary at a relatively slower rate and operate directly on the magnetic particles as described above.

The shape of particles may affect the agitation and for improved results in the present invention may be formed as individual needle-like or acicular shaped elements. Such a particle will tend to align itself with the principal or long axis perpendicular to the interface and in oscillating back-and-forth provide a high degree of agitation. Further, such needle-like or elongated shapes readily become magnetized to a semi-permanent magnet in the appropriate low-frequency magnetic field.

Further, the agitation of such particles should contribute to the fusion bonding not only in intermixing of the material but may also introduce a mechanical interlocking of the material even though fusion may not be created at a particular interface. This will further contribute to the bond strength at the interface, and is particularly desirable in the presence of surfaces having different optimum bonding characteristics.

The particles may be a combination of different types to provide different functions for promoting of an improved bond. Thus, some of the particles may have a characteristic to produce polarization for alignment with the low-frequency field and others may function as a heat source as a result of the high-frequency field or impressed energy field while still further particles may be introduced to reduce the reluctance of the flux path with an increased magnetic intensity at the interface. The single type particle producing the dual functioning of heat and agitation may be desirable in producing optimum heat location for promoting a better flowable condition of the particles. The simultaneous impressing of the relatively low-frequency mixing field and high-frequency heating field which produces the simultaneous interrelated action would appear to provide maximum response and characteristic and is therefore particularly useful as the bonding method in high speed, commercial production processes.

In carrying out the present invention, either one or both of the surfaces to be joined may be appropriately provided with the desired magnetic particles. Alternatively, a separate carrier agent or element may be provided and interposed between the surfaces which are to be joined. This may be particularly desirable where the surfaces to be joined have significantly incompatible bonding characteristic. Further, as a practical matter, the carrier bonding element can be readily mass produced as a rigid or flexible element which is readily applied as an interface layer between other preformed elements to be bonded to each other. The carrier bonding element may of course also be printed or otherwise coated on the substrate or surface, or dry powder and resin particles may be applied by electrostatic coating techniques and the like.

The present invention thus provides a highly improved bonding method and apparatus which can be readily applies to various structures, processes and devices. Although the several parameters normally carefully selected and controlled remain highly significant, they do not have the same critical significance in order to obtain a selected strength.

DESCRIPTION OF THE DRAWING

The drawing furnished herewith illustrates the best mode presently contemplated for carrying out the invention and described hereinafter.

In the drawing.

DESCRIPTION OF THE ILLUSTRATED EMBODIMENT

Figure 1:
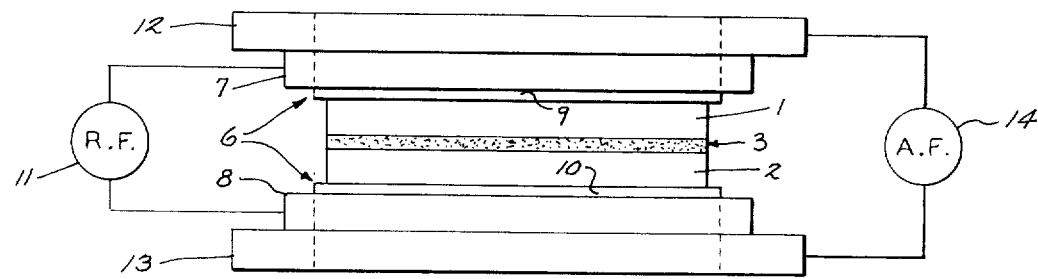
FIG. 1 is a diagrammatic illustration of apparatus illustrating the method for bonding of a pair of superimposed plastic layer in accordance with the present invention.
Figure 2:
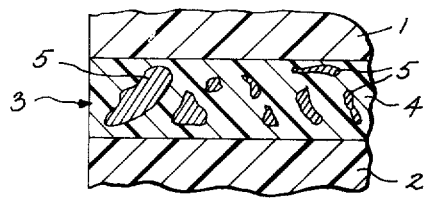
FIG. 2 is a substantially enlarged view of a portion of the stacked elements of FIG. 1 and illustrating one construction in accordance with the teaching of the present invention.
Figure 3:
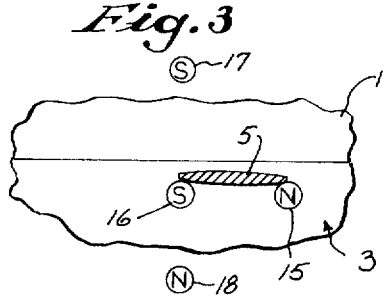
FIGS. 3 through 8 are similar sequential views illustrating an ideal characteristic interaction to be obtained with the method and apparatus of the present invention.

Referring to the drawing and particularly to FIG. 1 the present invention is illustrated in an apparatus to form a connection between a pair of overlapped substrates 1 and 2 which at least include a heat softenable material such as thermoplastic surfaces at the interface. An intermediate bonding element 3 is interposed between the overlapping interfaces to be joined and is especially constructed in accordance with the teaching of the present invention of a plastic base 4 and interacting particles 5 to provide a highly improved fusion bond to the two substrates 1 and 2 and thereby firmly connect the substrates to each other. The substrates 1 and 2 are formed to a desired intermediate or final configuration; for example, strip elements having overlapped edges which are to be interconnected. The bonding layer 3 is formed of a configuration and shaped correspondingly to the desired bonded interface area and is appropriately located between substrates 1 and 2. The stacked elements 1 – 3, as diagrammatically illustrated in a simplified form in FIG. 1 and 2, are mounted within a heating and clamping assembly 6 for joining of the substrates 1 and 2 by fusion bonding to the layer 3. The structure illustrated is shown in simplified form for purposes of clearly illustrating the significant aspects of the present invention, and as subsequently noted many various forms of apparatus may be employed in a practical installation. For example, the substrates might be moving through the coil assembly with a pressure means to maintain a force during the cooling of the bonded surfaces. The illustrated assembly 6 includes magnetic field generating means comprising upper and lower coil units 7 and 8 located to the opposite sides of the superimposed elements 1 – 3. The coil units 7 and 8 are shown wound on suitable magnetic coil forms 9 and 10 and are connected to a suitable radio-frequency generating source 11 which preferably produces a radio-frequency energy. When employing particles such as disclosed in the U.S. Pat. No. 3,574,031, the source preferably provides an output in the megacycle frequency range which has of course been found to be particularly operable. In addition, a second magnetic field means superimposes a relatively low-frequency field on the high-frequency field. In the illustrated embodiment of the invention, the second field means includes a pair of magnetizing coil units 12 and 13 located with one coil unit 12 above and one coil unit 13 below the radio-frequency source coil units 7 and 8. The coil units 12 and 13 are connected to a suitable relatively low-frequency generating source 14 producing energy in the audio-frequency range and which will typically operate in the frequency range of 1,000 to 10,000 hertz. The simultaneous energization of the coil units 7 and 8, 12 and 13 simultaneously generates and impresses the two magnetic fields and particularly throughout the bonding interfaces defined by the intermediate bonding agent or element 3. Although shown and described as coil units, any suitable transducer means can of course be employed.

The coil units 12 and 13 may be wound on the common coil forms 9 and 10 which are shown relatively movable to also apply bonding pressure along the bonding interface. The coil forms will normally be formed of a low loss material to prevent heating and the like where the radio-frequency heating energy is provided. Thus, although pole members might be desirable to channel or concentrate the audio power, the radio-frequency energy would generally severely limit any useful or practical life of known coils. Further, although a dual coil construction provides coils to opposite sides of the work area, a single coil system might also be employed.

In accordance with the teaching of the present invention, the intermediate bonding agent or element 3 includes a thermoplastic carrier or base 4 which is compatible and fusible with the opposite substrates 1 and 2 and will provide a reliable fusion bond therewith in the presence of a proper heating of the interface. In accordance with the illustrated embodiment of the present invention the bonding agent 3 also includes the plurality of distributed particles 5 which are especially selected to respond to the high-frequency magnetic field to form heat centers or sources and to the relatively low-frequency magnetic field to form magnetic elements which move into polarized alignment with the impressed relatively low-frequency field. The particles may be prepolarized as small permanent magnets or form semipermanent magnets as a result of the impressed magnetic field.

More particularly, the radio-frequency field of coils 7 and 8 applied to the magnetic particles generates heat at the interface providing the controlled transformation at the interface of the surfaces to a flowing or moving molten state thereby providing for the known fusion bonding phenomena. This result is fully set forth for example, in the previously referred to U.S. Pat. No. 3,574,031, as a result of the hysteresis type heat generation. However, when employing particles as a heat source, the usual eddy current phenomena may also be employed by selection of appropriate conductive and generally larger particles. The radio-frequency magnetic field, particularly when employing the megahertz range, changes so rapidly that the particles remain essentially fixed within the carrier.

Figure 4:
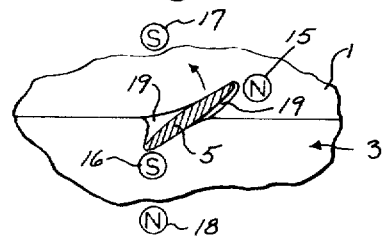
Figure 5:
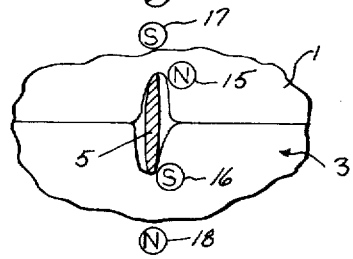
Figure 6:
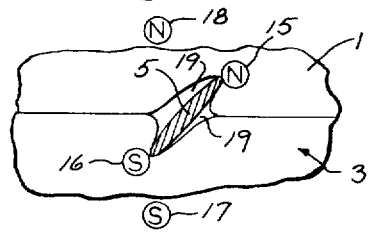
Figure 7:
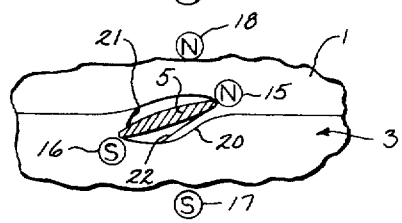
Figure 8:
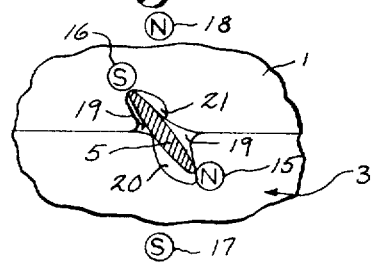

The frequency of the second magnetic field is such that it will not generally produce significant heating, particularly with the nonconductive magnetic particles. The relatively lower frequency magnetic field applied to the particles, however, results in movement of such particles 5 to effect an agitation of the heated, flowable interface material 1, 2 and 3 to thereby contribute to an effective bonding thereat. Referring particularly to the enlarged sectional fragmentary views of FIGS. 3 – 8, a single particle 5 is illustrated at the interface of the substrate 1 and the bonding agent 3. For purposes of discussing the apparent functions of the described embodiment, FIGS. 3 – 8 show an idealized condition for a single, needle-like particle 5 located adjacent to and parallel with the interface at the initial point or start of analysis. Assume that a particle 5 has been prepolarized or had assumed the illustrated polarization with the north pole 15 to the right end and the south pole 16 to the left end of the illustrated particle. When the polarity of the audio-frequency magnetic field produces a south pole 17 to the top side of the assembly and a north pole 18 to the opposite side, the particle 5 will tend to rotate to align itself with the impressed field as a result of the well-known attraction of unlike magnetic poles and repulsion of like or the same magnetic poles. As the field increases in this direction, the particle 5 will continue to move or rotate and in an optimum state, rotates as shown in FIGS. 4 and 5 to align itself with the field. In so moving, the particle 5 moves through the plastic material of elements 1 and agent 3. The softened material will, of course, flow about the particle 5. Depending upon the fluid state, and the rate of particle movement, a slight void or gap 19 may develop to the trailing face or edge of the particle. When the energization of coils 12 and 13 reverses as a result of the opposite half cycle output of the source 14 the impressed poles are reversed, as shown in FIGS. 6 – 8. The particle 5 will tend to continue to rotate in the same direction, or reverse rotation, as shown in FIGS. 6 – 8, to the initial position and therefrom to a reverse position across the interface. The softened material of substrate 1 and agent 3 will, of course, flow about the particle 5. As the particle 5 rotates, the softened material on the leading face of the particle is driven or forced to move and portions of the two materials will tend to be carried into the opposite element as shown in FIGS. 7 and 8 by the materials 20 and 21. Upon another reversal of the audio-frequency field to the initial assumed polarity, the particle again rotates in the same or opposite direction providing further movement and agitation of the material.

Thus the audio-frequency field will tend to continuously move or oscillate the particles 5, which will continuously agitate and intermix the two materials thereby improving the wetting and bonding characteristics of the softened or fluid interface. The agitation should also tend to move surface contaminents into the interior of the materials and present cleaner surfaces at the interface to further promote better joining of the materials. Further, the agitation may move the particles from one substrate to the adjoining substrate. The intermixed materials at the interface by appropriate agitation will often permit development of a transition zone with a gradual transition from the one substrate or material to the second substrate or material with an improved joining of the substrates. Thus, the improved wetting and mixing may even permit joining of plastics which have generally been considered incompatible for normal fusion bonding.

Further, the magnetized particle action in carrying of the materials along the face or ends of the particle may produce a mechanical interlocking where the material continues as an extension from one layer to another as well as aadding to the general fusion action; thereby further contributing to the bonding characteristic and strength. If the particle movement is quite rapid, a void may develop behind the particle. Generally, the magnetic particles will be appropriately wetted by the plastic material which might be provided by addition of chemical additions such as silane and voids should not be generated in any significant degree. Thus, voids, air pockets and the like foamy type interface structures will usually not be desired in order to produce a maximum bond. If the particle should terminate in a position such as in FIG. 7, the softened material behind the particle would tend to flow to fill the slight gaps or voids 19. This would also provide a mechanical joint between the materials of substrate 1 and agent 3 as at 22. The character of a void may, of course, vary and might be of an hourglass shape such that material flowing into the void would produce a tongue and groove connection. The illustrated interlocks have been shown in very simple form for purposes of explanation. In practice much more complex mechanical interlocks can be anticipated.

From a review of the idealized characteristic shown in FIGS. 3 – 8, the physical configuration of the particles may affect the agitation characteristic. Smooth spherical members tend to oscillate within the plastic material with minimum agitation whereas particles which are elongated needle-like members or elements will tend to produce greater agitation characteristics, and those of greatest length should have maximum twisting torque. However, when employing the heating particles as described above, the particle size is relatively small to prevent hot spots. Further, if the particles 5 have relatively roughened surfaces, such as shown in FIG. 2, the protrusions may further contribute to the movement of the softened material to produce a highly improved agitation and interlocking.

Generally, as noted previously, the radio-frequency field for generating heat in the particles will be above 10,000 hertz and will normally be of the order of 100,000 hertz or above, and preferably substantially above that and generally in the megahertz range where the ferromagnetic particles of the previous Heller patent are used. The audio-frequency range for generating particle movement will typically be in a range of about 60 to 10,000 hertz in order to permit the desired movement of the particles. The particles 5 in turn will be selected to produce optimum results and may be of any desired construction and material which will respond to the magnetic fields to produce the desired functioning. The relationship between frequency range and particle would not appear to be critical.

One illustrative example of constructing the intermediate bonding element or agent 3 would be milling approximately 20% by weight of gamma iron oxide ($FE_2O_3$), magnetic iron ($Fe_3O_4$) or like particles into the bonding carrier 4 while the latter is in a heat softened condition. Generally, useful heating has been obtained in the prior art by employing between 2% and 50% by weight. Such forming processes have been employed in the addition of such particles to material for the high-frequency bonding concept. The longest dimension of the iron-oxide heat-generating particles 5, as in such art, is typically within the range of submicron to 20 microns. However, as previously noted, particles of magnetic metal alloy which generate heat as a result of eddy currents may also be employed. Such particles may be several hundred microns. The smaller nonconductive particles are desirable in distributing the heated areas completely over the interface and thus assuring a more complete interface bonding. The larger particles may tend to heat somewhat more quickly and as a result of the size provide stronger localized mechanical forces. However, the large particles might, of course, also create localized rather than a continuous interface bond which is promoted by the smaller nonconductive particles.

The intermediate bonding element 3 is particularly desirable in those applications where it is desired to provide an intermediate layer for any reason such as simplification of the addition of the particles, or the like. The bonding element 3 is also highly significant where the substrates have such different fusion characteristic that they will not readily directly fuse to each other. The intermediate element 3 is then formed with a carrier material 4 which does bond to each of the substrates and thereby produces a highly desirable connection between the substrates.

Figure 9:
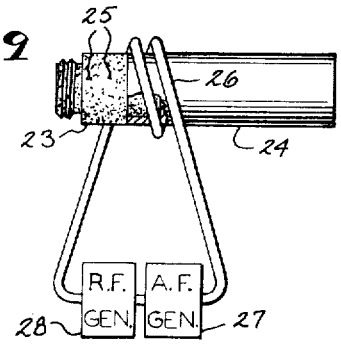
FIG. 9 illustrates an alternative apparatus and method without the use of an intermediate bonding element or layer for joining of a pair of surfaces.

For optimum results, pressure is preferably applied simultaneously with the application of the magnetic fields to simultaneously produce the bonding pressure and the agitation. Improved results will, of course, also be obtained as the result of the agitated interface even though the bonding pressure is applied immediately following the application of the magnetic fields and while the intermixed material is in the molten or fusing state. For example, if a continuous bond is to be effected along the edges of elongated overlapped layers, the edges can be progressively passed through the magnetic field sources and then through suitable pressure applying devices such as a pair squeeze, rollers, not shown, located immediately downstream of the discharge end of the high-frequency magnetic field means. Further, the interface may be brought to the appropriate movable state and then passed through an agitation field means. The in-line processing would be desirable in order to permit separation of the field pole structure. However, in the sequential step processing of the bond areas, the relative minute heat generation particles and the rapid loss or transfer of heat to the surrounding relatively cool material may call for only a short elapsed time between steps.

Where the material of elements to be interconnected are readily compatible and where one, or both of the elements, can be formed directly with the particles located in the interface area, the intermediate bonding element or layer 3 may, of course, be so eliminated; for example, such as shown in FIG. 9. The application of FIG. 9 is similar to that disclosed in the copending application of Alfred F. Leatherman entitled FABRICATING METHOD AND ARTICLE FORMED THEREBY, Ser. No. 363,177, filed May 22, 1973, where a plug type insert 23 is to be secured within the end of a tube member 24. The small insert member 23 is preformed with appropriate particles 25 dispersed throughout the member 23. The preformed member 23 is located within the end of member 24. A coil unil 26 is located about the overlapped area and an audio-frequency source 27 and a radio-frequency source 28 are connected in series to the coil unit 26 to simultaneously impress the relatively high heating frequency field and the relatively low mixing frequency field to the localized, overlapping area. The particles 25 at the interface will function in the same manner as in the previous or first embodiment. The particles spaced from the interface will also tend to oscillate. This should not interfere significantly with the process. Thus, the radially outwardly spaced particles aligned with the coil unit 26 may also cause a somewhat molten condition, but the material will return to the original state. The axially spaced particles will probably not generate any significant heat and thus the particles will not move as the resin remains in the solid state.

The illustrated embodiments have been described with each particle functioning both as a susceptor or heat source as well as a magnetically driven agitator. The particles may be a mixture of different types including particles some of which only function as susceptor particles and others of which only function as an agitator source as well as still others which are dual function particles. In addition, where a magnetic field is employed, still other particles may be employed to concentrate the flux field and thus increase the field intensity at the interface. For example, a mixture of iron oxide particles, barium ferrite particles and highly permeable iron particles would respectively provide high heat generation, good agitation and a low reluctance flux path. A mixture might also be employed where a different type of energy based on, for example, dielectric heating, was employed to activate the particles to generate heat from that employed to activate the particles for agitation. Further, a direct heating means might be employed to create the molten or flowing state at the interface, with a magnetic, electrical or other similar varying field applied to the particles to create the agitation. The common functioning particle should generally, however, provide optimum results if the particle material is selected to properly respond to both the relatively high-and-low-frequency fields, as the molten state is created immediately adjacent the particle and should permit maximum agitation.

Further, although separate sources are shown, other means of creating the two fields might, of course, be employed. Thus, a basic audio field may be established with a high-frequency field signal superimposed thereon. Further, the present invention employing the particles with an appropriate electric or magnetic agitating field provides a highly practical concept of improving the bond characteristic. The improvement results from the agitation or vibration of the interface materials and thus within the broadest aspect of the invention any method of generating such vibration may be employed.

The present invention has also been particularly described in connection with thermoplastic materials, but can be also applied to thermosetting plastics. The several plastic materials to which the present application is applicable may be generically defined as thermoplastic materials.

The present invention thus provides an improved means of fusing adjoining plastic surfaces and like which can be temporarily placed in a flowable state or condition.

The invention has been particularly described with the use of alternating current fields which have been widely used in the particle heat source field. However, pulse and transient fields such as shown in Heller Pat. 3,665,856 may be equally employed in creating the desired agitating particle movement.

Various modes of carrying out the invention are contemplated as being within the scope of the following claims particularly pointing out and distinctly claiming the subject matter which is regarded as the invention.

We claim:

1. A method of joining adjoining surfaces of material adapted to be temporarily placed in a movable state, comprising the steps of interposing a plurality of particles at the interface of the surfaces to be joined, said particles being selected to follow orientation of an energy field and thereby physically move at the surfaces in response to a changing energy field, and subjecting said particles to said changing energy field with a rate of change providing a significant physical movement of said particles to enhance the joinder of the materials at the interface.

2. The method of claim 1 wherein said particles are formed of a magnetizable material, and said subjecting step includes impressing a polarized changing magnetic field to produce agitation of the particles of a frequency no greater than the order of audio frequencies whereby the particles at least partially move with said magnetic field.

3. The method of claim 1 wherein said particles respond to an electric field, and said subjecting step includes creating of a changing electric field of a frequency no greater than on the order of audio frequencies whereby the particles at least partially move with said magnetic field.

4. The method of claim 1 wherein said energy field is a polarized field impressed across said interface and is periodically reversed to shift the field at a rate no greater than on the order of audio frequencies and thereby physically moving of said particles at said interface to effect an intermixing of the materials at the interface.

5. The method of claim 1 wherein said materials include a thermoplastic, and including the step of impressing a heat source means upon said material in addition to said changing energy field to create said movable state of said surfaces and providing for said response to said changing energy field.

6. The method of claim 1 wherein the bonding of said material is promoted in response to heating, said particles including particles generating heat in response to a radio-frequency field, comprising the additional step of impressing in addition to the changing energy field a radio-frequency field upon said plurality of particles to define heat centers to create said flowable state and promote said bonding.

7. A method of joining adjoining surfaces of material adapted to be temporarily placed in a movable state, comprising the steps of interposing a plurality of particles at the interface of the surfaces to be joined, said particles being selected to move at the surfaces in response to a changing energy field, and subjecting said particles to a changing energy field to move said particles to enhance the joinder of the materials at the interface, said adjoining surfaces are placed in said flowable state by heating, said particles including particles responsive to a radio-frequency field to form heat sources, and said subjecting step including exposing said interface to a complex alternating magnetic field, said field including frequencies in the radio-frequency range activating said particles to generate heat and frequencies in the audio-frequency range to define a polarized agitating field interacting with said particles, said particles further including particles defining individual magnets which move in response to the changes in the polarization in said polarized agitating field.

8. The method of claim 7 wherein said particles include different particles responding to said radio-frequency field and to said audio-frequency field.

9. The method of claim 1 wherein said particles are elongated needle-like elements which longitudinally align with the orientation of the field.

10. The method of claim 1 wherein the surface of said particles have a substantially roughened surface to define a plurality of projections.

11. The method of claim 10 wherein said particles are elongated needle-like elements which longitudinally align with the orientation of the field.

12. A method of joining adjoining surfaces of material adapted to be temporarily placed in a movable state, comprising the steps of interposing a plurality of particles at the interface of the surfaces to be joined, said particles being selected to follow orientation of an energy field and thereby physically move at the surfaces in response to a changing energy field, and subjecting said particles to said changing energy field with a rate of change providing significant physical movement of said particles to enhance the joinder of the materials at the interface, all of said particles being of a similar magnetic material, said particles responding to a radio-frequency field to generate heat and being magnetizable to form a magnet, said field including a relatively low varying frequency magnetic field essentially no greater than an audio-frequency to move said particles and a second frequency magnetic field above essentially 10,000 hertz to generate heat in said particles.

13. A method of joining adjoining surfaces of material adapted to be temporarily placed in a movable state, comprising the steps of interposing a plurality of particles at the interface of the surfaces to be joined, said particles being selected to follow orientation of an energy field and thereby physically move at the surfaces in response to a changing energy field, and subjecting said particles to said changing energy field with a rate of change providing significant physical movement of said particles to enhance the joinder of the materials at the interface, said materials at said interface being formed of thermoplastic materials, said particles being formed of a nonconductive magnetic oxide, said energy field being a complex magnetic energy field including an alternating current radio-frequency magnetic energy field and an audio-frequency magnetic energy field.

14. The method of claim 13 wherein said magnetic energy field includes a first field of the order of at least 10,000 hertz and a second field in the audio-frequency range.

15. The method set forth in claim 1 for joining a pair of members by interposing a connecting layer therebetween to define a pair of interfaces of material in said flowable state, said connecting layer having said particles embedded in a carrier material.

16. The method of claim 15 wherein said members and said carrier are placed in said flowable state by heat, impressing a radio-frequency field upon said interface and activating said particles to generate heat and an audio-frequency magnetic field to define an agitating field interacting with said particles, said particles defining individual magnets which move with the polarization of said audio-frequency magnetic field.

17. The method of joining a pair of contacting heat-fusible thermoplastic surfaces at the interface, comprising the steps of positioning at the interface a deposit of fine discrete susceptor particles selected from the chemical family of ferromagnetic oxides, impressing a radio-frequency induction heating field upon said particles and thereby bringing said contacting interface materials to a flowable condition, and impressing a moving polarized magnetic field upon said particles at a frequency significantly lower than the frequency of said induction field to thereby cause such particles to physically move within said flowable material to agitate and intermix said two materials.

18. The method of claim 17 wherein said particles are needle-like elements and forming semipermanent magnets in the presence of a magnetic field, said polarized magnetic field being an audio-frequency magnetic field extending essentially perpendicularly across said interface.

19. A method of joining adjoining surfaces of material adapted to be temporarily placed in a movable state, comprising the steps of placing the surfaces in said movable state, and applying a changing energy field to the interface of the surfaces while in said movable state, said energy field changing at a relatively low frequency whereby said surfaces can physically move in response to said changes and thereby significantly, physically move and agitate the surfaces and thereby enhance the joinder of the materials at the interface.

* * * * *

UNITED STATES PATENT AND TRADEMARK OFFICE
CERTIFICATE OF CORRECTION

PATENT NO. : 3,941,641
DATED : March 2, 1976
INVENTOR(S) : WILLIAM C. HELLER, JR. and ALFRED F. LEATHERMAN It is certified that error appears in the above-identified patent and that said Letters Patent are hereby corrected as shown below:

Column 1, Line 15, after "interface" cancel "of" and insert --- to ---;

Column 1, Line 56, before "INVENTION" cancel "PRESEENT" and insert --- PRESENT ---;

Column 2, Line 34, after "orientation" cancel "cuase" and insert --- cause ---;

Column 6, Line 45, after "as" cancel "aadding" and insert --- adding ---;

Column 7, Line 32, cancel "(FE$_2$O$_3$) and insert --- (Fe$_2$O$_3$) ---;

Signed and Sealed this first Day of June 1976

[SEAL]

Attest:

RUTH C. MASON
Attesting Officer

C. MARSHALL DANN
Commissioner of Patents and Trademarks